3,703,575
RECONSTRUCTED CARTILAGINOUS TISSUE AND METHOD OF IMPLANTING IT INTO THE HUMAN OR ANIMAL BODY
Heinrich Thiele, Neue Universitaet Haus A2, Kiel, Germany
No Drawing. Original application Oct. 2, 1967, Ser. No. 671,981. Divided and this application Dec. 23, 1970, Ser. No. 101,124
Int. Cl. A61f 1/00
U.S. Cl. 3—1
9 Claims

ABSTRACT OF THE DISCLOSURE

Tendons, cartilage tissue, nerve sheaths, and the like cartilaginous materials which are useful in surgery for replacing damaged tissue of this type and for implantation into the body consist of protein- and muco-polysaccharide-containing ionotropic gels with oriented filamentary molecules. They correspond in their structure to the histological structure of the natural tissue to be replaced and are of high mechanical stability, strength and elasticity.

The reconstructed cartilaginous tissue is implanted in the human and animal body by surgery. It is well tolerated and readily accepted by the human and animal body.

CROSS-REFERENCE TO RELATED APPLICATION

The present application is a division and continuation-in-part of copending application Ser. No. 671,981, filed Oct. 2, 1967, now U.S. Patent No. 3,551,560 granted Dec. 29, 1970 and entitled "Process of Reconstructing Tendons, Cartilage, Nerve Sheaths, and Products."

BACKGROUND OF THE INVENTION

(1) Field of the invention

The present invention relates to reconstructed cartilaginous tissue, such as tendons, ligaments, cartilage, for instance, forming the cartilage layers between the bones, which bind them firmly together, nerve sheaths, and the like tissue material, said cartilaginous tissue being similar in its structure and composition to natural connective tissue, such as tendons, ligaments, nerve sheaths and the like but differing therefrom by being free of, or poor in, antigenic substances, so that it can readily be used for surgically replacing such diseased or injured tissue in the human or animal body.

(2) Description of the prior art

Heretofore nerve injuries in which the nerve was completely severed were surgically treated by carefully stitching the severed nerve ends together. Difficulties arose, however, when the ends of the damaged nerve were so shortened that they could not be brought together to meet. In such cases a portion of a sensory nerve or of a nerve from an animal was sometimes inserted and carefully stitched between the separated ends.

Likewise torn tendons were stitched together. But these operations were not always successful and post-operative complications and irreparable damage were frequently the final result.

No attempts have heretofore been made to replace, for instance, the extended or protruding intervertebral disks. Such defects were treated by surgically removing and concurrently fusing the involved spinal segments.

SUMMARY OF THE INNVENTION

It is one object of the present invention to provide a new and valuable cartilaginous material which corresponds in its composition and structure to natural human or animal cartilage and which is well tolerated and readily accepted by the human and animal body.

Another object of the present invention is to provide a new and valuable tendon material which corresponds in its composition and structure to natural human or animal tendons and which is well tolerated and readily accepted by the human and animal body.

Still another object of the present invention is to provide a new and valuable nerve sheath material which corresponds in its composition and structure to natural human or animal nerve sheaths and which is well tolerated and readily accepted by the human or animal body.

A further object of the present invention is to provide a new and valuable replacement material for replacing intervertebral discs, which have become defective, said material corresponding in its composition and structure to natural human or animal intervertebral discs and being well tolerated and readily accepted by the human or animal body.

A further object of the present invention is to use such new and valuable reconstructed cartilage, tendon, nerve sheath, or other cartilaginous parts of the body in surgery for replacing diseased or injured cartilage, tendons, nerve sheaths, or other cartilaginous parts of the body.

Other objects of the present invention and advantageous features thereof will become apparent as the description proceeds.

In principle the process of regenerating and reconstructing cartilage and tendons comprises the following steps:

(a) Human or animal cartilaginous tissue such as tendons and others are exposed to solutions containing agents which are capable of splitting hydrogen and sulfur bridges, preferably urea and amines, alkaline agents, for instance, alkali metal hydroxides, such as lithium hydroxide or sodium hydroxide, salts such as sodium chloride and especially salts with hydrotropic activity, for instance, lithium rhodanide, zinc chloride, or thio-compounds, for instance, dimethylsulfoxide, dimethylformamide, and others. Said dissolving agents may also be used in mixture with each other, or the respective tissue may be treated therewith successively, repeatedly, and/or alternately. Of course, only dissolving agents and solvents can be used which do not cause any substantial denaturation of the proteins. This treatment causes swelling of the tissue.

(b) The mucopolysaccharides present in the tissue are removed therefrom either in a separate extraction step or during swelling by using solvents which are capable of dissolving the same.

(c) The swollen tissue can then readily be separated mechanically into separate layers, if such are present, said layers corresponding to the histological specific structure of the natural starting material.

(d) Thereafter the swollen tissue, or the separated layers thereof, each by itself, are dispersed mechanically and are dissolved in the same or other solvents to form a colloidal solution whereby care is taken that no substantial degradation of the chain of the filamentary molecules of the tendon or cartilage material takes place. Preferably such mechanical dispersion and dissolution is carried out at room temperature.

(e) Excess of the dissolving agent is removed from the resulting colloidal solution by decanting and dialysis or electrodialysis against water and entrained air bubbles are removed, for instance, by centrifuging or by exposing the sol to a vacuum.

(f) For reconstructing cartilage, tendons, or the like, the resulting colloidal solution containing the proteins of such cartilage, tendons, or the like, or the solutions containing their separate layers, are converted into a gel by allowing gel-forming ions to diffuse thereinto. Thereby orientation of the gelled filamentary protein molecules takes place. Of course, only such ions which do not cause substantial denaturation of the proteins are used for gel formation. Preferably the initially removed mucopolysaccharides or more advantageously, in their place, alginates or other substantially inert polyuronic acids are admixed to the colloidal solution before gel formation. The mucopolysaccharides or, respectively, the polyuronic acids such as alginic acid and the like are admixed to the sol and dissolved therein in a predetermined amount as ascertained by preliminary tests. These preliminary tests are carried out with varying proportions of protein to mucopolysaccharide in order to determine the mucopolysaccharide addition required to achieve optimum orientation on reconstruction and regeneration of the cartilaginous material. Elasticity and strength characteristic of the resulting gel which corresponds in its structure to the natural cartilage, tendons, or the like, may be increased and improved by allowing the ions to diffuse periodically in so-called ion waves. Biological tanning may also be employed for this purpose.

The resulting gels of oriented filamentary molecules of the protein of the cartilaginous tissue can be produced in any desired shape, for instance, in the form of balls, tubes, membranes, fibers, and the like. For this purpose correspondingly shaped molds wherein gel formation is effected, are employed. On causing the ions to diffuse into the sol while exposing the sol to additional directional forces, for instance, by mechanically causing the sol to flow and rotate, the filamentary molecules may be oriented in the form of spirals and in the form of filaments crossing over each other. Thereby, spirals rotating in the same direction or contrarotating spirals may be formed. The spirals may also have different angles of inclination or pitch. The crossing over filaments may be arranged like the warp and woof in fabrics. As a result of such exposure to additional directional forces the stability of the gel can be considerably increased.

The electrolyte supplying the gel-forming ions may be a dilute organic acid such as lactic acid or citric acid. Metal salts may also be used for gel formation. The preferred metal ions are those of polyvalent metals such as copper, cadmium, calcium, aluminum, lanthanum, zinc, and others which are preferably supplied in the form of their nitrates, although other salts may also be used. Once the final structure of the gel is formed, the metal ions can be exchanged by hydrogen ions without any substantial change in the structure and orientation of the gel. Only very small ion concentrations, comparable to those of trace elements, are necessary for gel formation.

In the same manner as described hereinabove for cartilage and tendon tissue, it is possible to reconstruct nerve sheaths. For this purpose (a) The axons or nerve fibers are mechanically separated from the nerve sheath. Separation of the axons from the nerve sheaths is effected, for instance, by longitudinally cutting the nerve sheaths and removing from the opened and spread out nerve sheaths the axons by means of a spatula or a knife. According to another method, by which the nerve sheaths remain undamaged, the nerve is squeezed out from the nerve sheaths by means of a hard tool so as to remove it at both ends of the sheath. If necessary, this procedure is repeated until the entire nerve content is squeezed out and only the nerve sheath remains.

(b) The nerve sheath is then caused to swell in the same manner as described for cartilaginous tissue and tendons by exposure to solutions which contain agents which are capable of splitting hydrogen and sulfur bridges, preferably urea and amines, alkaline agents, for instance, alkali metal hydroxides, preferably lithium hydroxide or sodium hydroxide, salts such as sodium chloride and especially salts with hydrotropic activity, for instance, lithium rhodanide, zinc chloride, and especially such agents with lyotropic properties. Said dissolving agents may also be used in mixture with each other. Or the respective tissue may be treated therewith successively, repeatedly, and alternately.

(c) The mucopolysaccharides present in the tissue are removed therefrom either in a separate extraction step or during swelling by using solvents which are capable of dissolving the same.

(d) The swollen tissue is then dissolved by mechanically dispersing the same and dissolving it in the same solvent used for swelling or in another suitable solvent whereby care is taken that no substantial degradation of the chain of the filamentary molecules of the nerve sheath material takes place. Preferably such mechanical dispersion and dissolution is carried out at room temperature.

(e) Excess of the dissolving agent is removed from the resulting colloidal solution by decanting and dialysis or electrodialysis against water, and entrained air bubbles are removed, for instance, by centrifuging or by exposing the sol to a vacuum.

(f) For reconstructing the nerve sheath the resulting colloidal solution containing the proteins thereof is converted into a gel by allowing gel-forming ions to diffuse thereinto. Thereby orientation of the gelled filamentary protein molecules takes place. Of course, care must be taken that the diffusing ions do not cause denaturation of the proteins. Preferably the initially removed mucopolysaccharides or, in their place, alginates or other substantially inert polyuronic acids are admixed to the colloidal solution before gel formation.

The mucopolysaccharides or, respectively, the polyuronic acids such as alginic acid and the like are admixed to the sol and dissolved therein in a predetermined amount as ascertained by preliminary tests. These preliminary tests are carried out with varying proportions of protein to mucopolysaccharides in order to determine the mucopolysaccharide addition required to achieve optimum results on reconstruction and regeneration of the nerve sheath.

The same electrolytes supplying the gel-forming ions are used as described hereinabove for reconstructing tendon and cartilage tissue and the procedure is also the same.

It is also possible to add to the sol used for reconstructing the tendon, cartilage, or nerve sheath material, lipids and therapeutic agents such as bacteriostatic and virostatic agents.

Furthermore, elasticity and strength characteristics of the resulting nerve sheath gels may also be increased and improved by allowing the ions to diffuse periodically in so-called ion waves.

If desired, the resulting gel may be cross-linked and rendered insoluble, for instance, by impregnating the gel with a suitable cross-linking agent, for instance, an aldehyde such as formaldehyde, an alkyl dialdehyde such as glutar dialdehyde or 1-hydroxy adipic dialdehyde, a di-isocyanate, or the like compound.

The resulting gels of oriented filamentary molecules of the proteins of the nerve sheath can also be produced in any desired shape, for instance, in the form of balls, tubes, membranes, fibers, and the like.

Exposure of the sol during ion diffusion to additional directional forces also causes further increase in the mechanical strength properties and the stability of the gel. By suitably rotating the flowing sol and changing the axis of rotation there can be produced nerve sheaths with several layers arranged at different angles of the fibrillas.

In a similar manner as described hereinabove there may be produced and reconstructed other cartilaginous tissue, such as intervertebral discs and other types of fibrocartilage such as the basilar fibrocartilage which fills the foramen lacerum of the skull, the circumferential fibrocartilage which forms a rim about a joint cavity, the connecting fibrocartilage which attaches opposing bones to each other by synchondrosis, the interarticular fibrocartilage plates which lie between opposed joint surfaces, and others, the alar cartilage of the wings of the nose, the auricular cartilage of the external ear, the costal cartilages connecting the true ribs with the sternum, the cartilaginous parts of the larynx, the eustachian cartilage, the epiglottic cartilage, and other cartilaginous tissue.

The resulting reconstructed cartilaginous tissues and parts which are non-toxic and non-allergenic are used in surgery as prosthetic grafts which do not deteriorate before infiltration of the body tissue through the interstices in the graft and which allow ingrowth of fibroblasts and gradual absorption and replacement of the graft by the body.

DESCRIPTION OF THE PREFERRED EMBODIMENTS

The following examples serve to illustrate the present invention without, however, limiting the same thereto.

Example 1

100 parts of tendons are separated from the Kangaroo tail, are mechanically freed of adhering tissue, and are cut to pieces and strips of a length of one cm. The mucopolysaccharides are removed therefrom by repeated extraction with 200 parts of 1% sodium chloride solution. Thereafter, the extracted tissue is swollen by placing it first into 0.1 N sodium hydroxide solution and thereafter into 2 N sodium hydroxide solution. The tissue is removed from the latter solution repeatedly and, after each removal, is placed into a new portion thereof. The swollen tissue is then placed into an aqueous 50% urea solution and is subjected therein to the action of a homogenizer, thereby yielding a clear viscous sol of the tendon material. Excess solvent is removed by dialysis. The sol is centrifuged to eliminate entrained air and any undissolved matter.

For reconstructing the tendon material 10 parts of sodium alginate are admixed to and dissolved in the centrifuged colloidal solution. The resulting clear, viscous symplex sol is poured as a thin coating over the surface of a porous mold of the desired shape and the mold is immersed into an aqueous N cupric nitrate solution. Diffusion of the cupric ions of said electrolyte solution through the porous mold causes formation of a thin membrane which is extended between two annular gaskets. Into this membrane there is introduced continuously and gradually the symplex sol while the mold is immersed in said electrolyte solution. Diffusion of the cupric ions through the mold, the porous membrane, and the gradually produced gel gradually builds up the gel whereby the tendon fibrillas and bundles of fibrillas are oriented and form the desired anisotropic gel structure. The cupric ions are then exchanged against hydrogen ions by treating the mold with the resulting gel with a dilute acetic acid solution. Excess hydrogen ions are removed from the layers by dialysis or electrodialysis.

Example 2

A sol is prepared as described hereinabove from cattle cartilage. After addition of the alginate, a porous, tubular mold of the desired diameter is immersed into the sol. An aqueous solution of 0.1 N cadmium nitrate is introduced into the interior of the tubular mold which is rotated to facilitate diffusion. The cadmium ions diffuse through the porous walls of the tubular mold into the solution and cause precipitation of a gel membrane on the surface of the mold. As soon as the gel membrane has attained the required thickness, the tubular mold together with the gel adhering thereto is removed from the solution and the cadmium nitrate solution is replaced by an 0.1 N citric acid solution. By repeatedly changing the citric acid solution, the cadmium ions are exchanged against hydrogen ions. Excess hydrogen ions are removed from the layers by dialysis or electrodialysis. The resulting gel consists of a tubular cartilage body of oriented filamentary protein molecules.

Example 3

The procedure is the same as described in Example 2 whereby, however, the tubular mold is provided with an outlet at its bottom and whereby the sol is passed through the interior of the rotating mold while the cadmium ions diffuse from the outside through the porous wall of the mold into the sol. By varying the speed and direction of flow of the sol in the mold and the speed and direction of rotation of the mold and by effecting these changes continuously or with interruptions it is possible to produce oriented cartilage gels of any desired structure.

Example 4

Hog tendons are converted into a sol as described in Example 1. The de-aerated sol, after addition of alginate, is forced through fine nozzles into an aqueous N cupric nitrate solution. Thereby fibers of reconstructed tendon material are produced. They are washed with distilled water and then immersed into a 40% formaldehyde solution for 24 hours. Thereafter the fibers are immersed into a solution of 100 parts by weight of 40% formaldehyde and 40 parts by weight of urea which has been buffered to a pH of 7.0 to 8.0 by the addition of 6 parts by weight of barium acetate. The barium ions replace the cupric ions by ion exchange. The thus treated fibers are heated to remove excess solution and to cause polycondensation to urea-formaldehyde resin which imparts increased stability and strength properties to the resulting tendon fibers.

Example 5

10 cm. long pieces of fresh nerves are mechanically freed of their axon by stripping or peeling off the sheath. The collected tubular sheaths are defattened by means of a mixture of dimethoxymethane and methanol (1:4) for up to two hours. The sheaths are treated with dilute hydrochloric acid to remove polyvalent cations and are immersed in an aqueous 0.1 N solution of lithium hydroxide. The swelling solution is repeatedly decanted and replaced by fresh solution. The swollen nerve sheaths are then dissolved in said lithium hydroxide solution by mechanical dispersion. The resulting solution is centrifuged to remove insoluble residue and to de-aerate the solution. Excess swellling agent is removed from the solution by dialysis in an oblique cylinder. Alginic acid is added thereto and dissolved therein in a proportion of one part of alginic acid to five parts of dry substance content of the nerve sheath solution and the solution is again de-aerated by centrifuging in a cooled centrifuge operating at 5000 revolutions per minute for 20 minutes. The resulting sol is placed into high cylindrical containers. Porous tubes are inserted into said cylinders and N cupric nitrate solution is filled into said porous tubes. Cupric ions diffuse through said porous tubes into the nerve sheath solution and cause gel formation around said tubes. The diameter of the porous tubes is selected so that the resulting tubular ionotropic gel which corresponds in its structure to that of natural nerve sheaths and thus represents a reconstructed nerve sheath has, after shrinking, the required diameter to be surgically stitched to the nerve ends.

In place of the dissolving agents used in the preceding examples for preparing the colloidal tendon, cartilage, or nerve sheath solution, there may be used other such agents.

In place of alginic acid, there may be used other polyelectrolytes such as pectic acid, pectins, chondrus acid, i.e. the acid derived from carragheen or Irish moss, carboxy methyl cellulose, polyacrylic acid and polymethacrylic acid, guaran phosphoric acid, and the like as additives to form the ionotropic gels. Various mucopolysaccharides derived from animal tissue such as hyaluronic acid, chondroitin sulfuric acids A and B, dermatan sulfuric acid, heparin, kerato sulfuric acids and others may be employed for this purpose although alginic acid has proved to be the preferred agent.

As stated above, swelling may also be effected with organic amines such as methylamine, dimethylamine, ethylene diamine, ethylamine, tetraethylene pentamine, and others which are preferably used after completely dehydrating the cartilage, tendons, or nerve sheath material.

The temperature at which swelling is effected is between about 23° C. and 27° C. and preferably at about 25° C. At lower temperatures swelling is considerably retarded while at higher temperatures solutions of low viscosity are obtained. Using alkali metal hydroxide solutions for swelling may cause degradation of the mucopolysaccharides which are very sensitive to alkaline agents.

The colloidal solution is obtained from the swollen material, for instance, by pressing it through the narrow gap formed by a piston which does not fit accurately a cylinder wherein the swollen material is placed. The resulting sol which is usually highly viscous and thixotropic is preferably diluted with water to twice its volume and is then dialyzed.

It may be pointed out that the proteins of tendons, cartilage, nerve sheaths and the like form with the mucopolysaccharides or uronic acids a so-called symplex compound. Said term "symplex" designates salts consisting of two colloidal components. It is such a symplex sol of protein and mucopolysaccharide that is oriented ionotropically on allowing ions to diffuse thereinto, thus causing orientation and partial dehydration of the filiform molecules and fixation of the latter to an ionotropic gel which has the desired macroscopic and microscopic properties and represents the organic matrix of the reconstituted tendons, cartilage, nerve sheaths, and the like. The symplex of a protein with a poly-anion such as alginic acid represents a colloidal-chemical unit at a specific pH-value. All the acid groups of the mucopolysaccharides or polyuronic acids, i.e. carboxyl or sulfonyl groups are bound by the protein. The symplex exhibits the behavior of a chemically unitary amphi-ion. From the colloidal-chemical view point such as amphi-ion exhibits all the properties of a structually viscous, lyophilic, filamentary or filiform molecule.

Optimum symplex sols contain predetermined amounts of protein and mucopolysaccharide or polyuronic acids. Usually a ratio of proteins to mucopolysaccharide between about 96:4 and 74:26 and preefrably between about 95:5 and 85:15 depending on the mucopolysaccharide or polyuronic acid used produces satisfactory gels on ion diffusion.

Orientation of the filamentary molecules by ion diffusion according to the present invention requires the selection of suitable compensating ions or "gegenions" which do not simply precipitate the filamentary molecules but which retain the oriented filamentary molecules at the same time in their gelled bond or association. Suitable salts are aluminum, chromium (III), nickel (II), lead (II), cadmium, copper (II), calcium salts, preferably their nitrates. In general, the gels produced with aluminum and chromium (III) ions are not very ductile and tend to crumble while those produced with calcium salts are relatively soft. The preferred ions are the cadmium and copper ions. Preferably 0.1 N to 0.5 N solutions of said salts are used whereby the dry substance content of the symplex sol is between about 0.3% to 1.0% and preferably between 0.5% and 0.75%.

It was found that the gels produced with metals of the transition series are gels with capillaries of a diameter of 0.5 mm. or less while those gels which are produced with aluminum and chromic ions usually do not possess such capillaries.

Gel formation may also be effected by a treatment with dilute mineral acids, such as 0.1 N hydrochloric acid. However, such a treatment has the disadvantage that the orientation of the filamentary molecules gradually decreases and that the gel slowly dissolves. Therefore, it is the preferred procedure either (a) to allow an acid to act on the sol while simultaneously cross-linking the filamentary molecules or
(b) to use acids the anions of which have a cross-linking effect.

Simultaneous treatment with an acid and a cross-linking agent is, for instance, achieved by using water-soluble cross-linking agents such as short-chain aldehydes, preferably formaldehyde, or $\alpha,\omega$-dialdehydes, such as glutar dialdehyde, 1-hydroxy adipic dialdehyde and the like compounds. For this purpose the sol is, for instance, covered by a layer of a mixture of 0.2 N hydrochloric acid and an 0.2% formaldehyde solution (1:1). The resulting gels are washed with water until excess formaldehyde is removed. The resulting gels show birefringence and are stable.

Treatment of the gels produced by the action of polyvalent metal ions, by means of acids and the above-mentioned cross-linking agents in order to exchange the metal ions by hydrogen ions is, of course, also possible.

Instead of using acids and cross-linking agents, the same gel-producing effect is achieved by means of acids the anions of which have a cross-linking effect. Such acids are, for instance, polybasic organic acids such as tartaric acid, malic acid, citric acid, and the like acids. These acids are capable of fixing the ionotropic gel structure for a prolonged period of time. Gel formation is achieved, for instance, by covering the sol with 0.1 N solutions of said acids.

Cross-linking, for instance, with formaldehyde may also be effected before treating the gel with acids in order to exchange the metal ions. For this purpose the gel is kept, for instance, at 4° C. in an 0.01% formaldehyde solution for at least 24 hours, whereafter replacement of the metal ions by hydrogen ions is achieved by a treatment with 0.1 N hydrochloric acid without dissolving or destroying the gel.

It is, of course, also possible to treat the gel with polybasic organic acids, for instance, with citric acid solutions whereby not only the metal ions are exchanged by hydrogen ions but also cross-linking takes place.

All gels which are produced by diffusion of polybasic organic acids show capillaries. Treatment of the sol with a mixture of 0.1 N acetic acid and 0.1% formaldehyde solution (1:1) yields an especially strong membrane which is free of capillaries.

Suitable softeners to be added to the sol before gel formation are, for instance, polydiols and polyvinyl-alcohols.

The addition of mucopolysaccharides to the portein sol before gellation is of importance with respect to the formation of the desired ionotropic structure of the gel. Pure protein sols yield only slightly ionotropic gels. But even small amounts of mucopolysaccharides produce pronounced ionotropic effects. Thus, for instance, addition of chondroitin sulfuric acid causes extensive formation of capillaries while hyaluronic acid is more particularly responsible for spatial cross-linking. Addition of these mucopolysaccharides results in strong orientation which is characterized by the birefringence of the gel.

The shaped articles, such as reconstructed tendons, nerve sheaths, cartilage, tubes, as described hereinabove in the examples as well as other shaped bodies such as discs useful as intervertebral discs, shaped larynx and ear cartilage parts and the like are characterized by being composed of a protein- and inert mucopolysaccharide-containing ionotropic gel with oriented filamentary molecules. This gel corresponds in its specific structure to the histological structure of the respective tissue. When implanted into the human and animal body in order to replace the corresponding diseased or destroyed natural tissue, it is readily accepted by the human and animal body. It has a surprisingly high mechanical stability, strength, and elasticity. It contains the proteins of the corresponding tissue in substantially unchanged, undegraded, and not denatured form. The filamentary protein molecules in said gel are arranged in substantially the same manner as in the corresponding natural tissue. The gel shows double refraction and ion exchange properties, i.e. it is capable of reversibly exchanging anions and cations, as this is the case in natural tissue. It is, of course, understood that the gel can be made in any shaped form so that it can be used for replacing various parts of the human body. The following example serves to illustrate the manner in which such shaped bodies made according to the present invention are implanted into the animal body. This example is, of course, only illustrative for the method of using the shaped bodies according to the present invention.

Example 6

A mongrel dog was anesthetized and its left hind leg was cut to expose its main nerve. A piece of 2 cm. length of said nerve was removed. Thereafter a piece of the reconstructed nerve sheath obtained according to Example 5 of about the same diameter as the removed nerve was placed so that it covered the two ends of the removed nerve and was then stitched thereto. The wound was closed under usual surgical precautions. It was found that after several weeks the dog had completely recovered the use of his leg and, on sacrificing the dog and examining the nerve it was found that the nerve had completely filled out the implanted nerve sheath and that the two ends of the nerve axon had grown together.

Similar results were obtained by replacing tendons, intervertebral discs, and other cartilaginous parts of the body by the gels produced according to the present invention.

The shaped cartilaginous parts made according to the present invention can also be used for surgical replacement of damaged or destroyed cartilaginous parts of the human body whereby the conventional surgical procedures are employed.

Of course, many changes and variations in the components of the reconstituted tendon, cartilage, nerve sheath, or the like cartilaginous material, in the defattening agents, the solubilizing agents, the gel-forming agents used, in the conditions of dissolving the natural starting material and of forming ionotropic gels therefrom, in the methods of working up the resulting reconstituted tendons, cartilage, nerve sheath, or the like cartilaginous materials and of storing them, in the surgical procedures used in replacing damaged or destroyed cartilaginous parts of the human or animal body, and the like may be made by those skilled in the art in accordance with the principles set forth herein and in the claims annexed hereto.

The term "agents which are capable of splitting hydrogen and sulfur bridges" as used hereinabove and in the claims annexed hereto comprises such agents which cause swelling of the cartilaginous tissue and thus act as swelling agents. Such agents frequently have also a dissolving effect upon the cartilaginous tissue.

The term "mucopolysaccharides" as used hereinabove and in the claims annexed hereto comprises not only the mucopolysaccharides present in animal and human cartilaginous tissue but also antigenicity-producing substances such as low molecular proteins and especially the gamma-globulins.

Excess swelling and/or dissolving agent which may contain the dissolved mucopolysaccharides and other antigenicity-producing substances is removed from the resulting colloidal cartilage solution not only, as stated above, by decanting and dialysis or electrodialysis against water, but also, especially if the mucopolysaccharides and other antigenicity-producing substances have been removed before dissolving the swollen cartilaginous tissue, by distilling off the solvent in a vacuum at a temperature not causing denaturation of the cartilage.

The terms "mucopolysaccharides" and "substantially inert polyuronic acids" as used hereinabove and in the claims annexed hereto comprise not only alginic acid and alginates, but also pectin and other polyuronic acids, pectinic acid, polyacrylic acid, and other suitable polyelectrolytes and their salts which are compatible with and do not detrimentally affect the cartilaginous tissue. The inert polyelectrolytes and especially alginic acid and alginates are preferably added to the sol of cartilaginous material in the form of their aqueous solutions containing, for instance, 1% to 3% of said polyelectrolytes.

As stated hereinabove and demonstrated in the examples, the ion concentrations causing gel formation may be relatively low. In general, ion concentrations between about 0.01 N and about 6.0 N are used. The temperature at which gel formation takes place is preferably between about 4° C. and about 40° C. Depending upon the thickness of the reconstructed cartilaginous tissue the gel-forming ions are allowed to act upon the sol for up to 12 hours.

The addition of lipids to the sol used for reconstructing tendons, nerve sheaths, or other cartilaginous parts of the body has a plasticizing or softening effect upon the resulting gel.

I claim:

1. The shaped, reconstructing body parts protein- and inert mucopolysaccharide-containing ionotropic gel with oriented filamentary molecules, said gel being in the shape of a cartilaginously tissued part of the body and corresponding in its specific structure to the histological structure of said cartilaginous tissue, said shaped, reconstructing body part gel, when used in surgery to replace such diseased natural cartilaginous tissue, being readily accepted by the human and animal body and being of high mechanical stability, strength, and elasticity, said gel containing the proteins of said tissue in substantially unchanged, undegraded, and not denaturated form, the filamentary protein molecules therein being arranged in substantially the same manner as in said natural tissue, said gel showing double refraction and being shaped as a reconstructing body part tendon, nerve sheath, cartilage, tube, intervertebral disc, larynx, ear cartilage, or the like in accordance with a process comprising the steps of
   (a) exposing mucopolysaccharide-containing protein tissue selected from the group consisting of cartilage, tendons, ligaments, nerve sheaths and the like cartilaginous tissue to swelling solutions having substantially no denaturing effect on proteins,
   (b) removing from said tissue the mucopolysaccharides present therein,
   (c) converting the swollen tissue into a colloidal protein solution,
   (d) adding a substantially inert foreign mucopolysaccharide to and dissolving it in said colloidal solution in an amount sufficient to cause orientation of the filiform collagen molecules in the ionotropic gel obtained in the following step, and
   (e) allowing gel-forming ions to diffuse into said colloidal solution to produce the reconstituted ionotropic tissue gel, said gel formation being effected in correspondingly shaped molds to produce any desired prosthetic reconstruction body part shape in the form of balls, tubes, membranes, fibers, and the like for reconstrutcing nerve sheaths, tendons, and cartilaginous tissue including intervertebral discs, the basilar fibrocartilage filling the foramen lacerum of the skull, the circumferential fibrocartilage forming a rim about a joint cavity, the connecting fibrocartilage attaching opposing bones to each other by synchondrosis, the interarticular fibrocartilage plates lying between opposed joint surfaces, the alar cartilage of the wings of the nose, the auricular cartilage of the external ear, the costal cartilage of the external ear, the costal cartilages connecting the true ribs with the sternum, the cartilaginous parts of the larynx, the eustachian cartilage, and the epiglottic cartilage, said resulting reconstructed cartilaginous tissues and parts which are non-toxic and non-allergic being used in surgery as prosthetic grafts which do not deteriorate before infiltration of the body tissue through the interstices in the graft and which allow in-growth of fibroblasts and gradual absorption and replacement of the graft by the body.

2. The shaped protein- and inert mucopolysaccharide-containing gel according to claim 1, wherein the mucopolysaccharide is alginic acid.

3. The shaped protein- and inert mucopolysaccharide-containing gel according to claim 1, wherein the gel formation is effected by gradual building up in a tendon mold in the desired shape of a tendon, wherein tendon fibrillas and bundles of fibrillas are oriented to form the desired tendon gel structure.

4. The shaped protein- and inert mucopolysaccharide-containing gel according to claim 1, wherein the gel formation is effected in a tubular mold in the shape of a nerve sheath and wherein the diameter of the tube is selected so that the resulting tubular ionotropic gel corresponds in its structure to that of a natural nerve sheath and has, after shrinking, the required diameter to be surgically stitched to the nerve end.

5. The shaped protein- and inert mucopolysaccharide-containing gel according to claim 1, wherein the gel formation is effected by forcing the colloidal protein solution through fine nozzles, thereby producing fibers in the shape of reconstructed tendon material.

6. The shaped protein- and inert mucopolysaccharide-containing gel according to claim 1, wherein gel formation is effected in a mold in the shape of a cartilaginous part of the human body.

7. The shaped protein- and inert mucopolysaccharide-containing gel according to claim 1, containing the mucopolysaccharide in a ratio of protein to mucopolysaccharide between about 96 to 4 and about 74 to 26.

8. The shaped protein- and inert mucopolysaccharide-containing ionotropic gel according to claim 7, wherein the ratio of protein to mucopolysaccharide is between about 95:5 and about 85:15.

9. The shaped protein- and mucopolysaccharide-containing gel according to claim 1, wherein the gel is crosslinked to improve its strength and stability.

References Cited
UNITED STATES PATENTS

| | | | |
|---|---|---|---|
| 3,408,659 | 11/1968 | Thiele et al. | 3—1 |
| 3,551,560 | 12/1970 | Thiele | 424—95 |
| 3,114,372 | 12/1963 | Griset et al. | 128—335.5 |

SHEP K. ROSE, Primary Examiner

U.S. Cl. X.R.

128—335.5; 424—95